Nov. 6, 1923.   1,472,855

E. SCHNEIDER

AUTOMATIC TENSIONING APPARATUS FOR CLOSING THE PARTS OF A CLUTCH

Original Filed Oct. 29, 1920    2 Sheets-Sheet 1

Inventor:-
Eugene Schneider
By Mauro, Cameron, Lewis & Massa
Attorneys

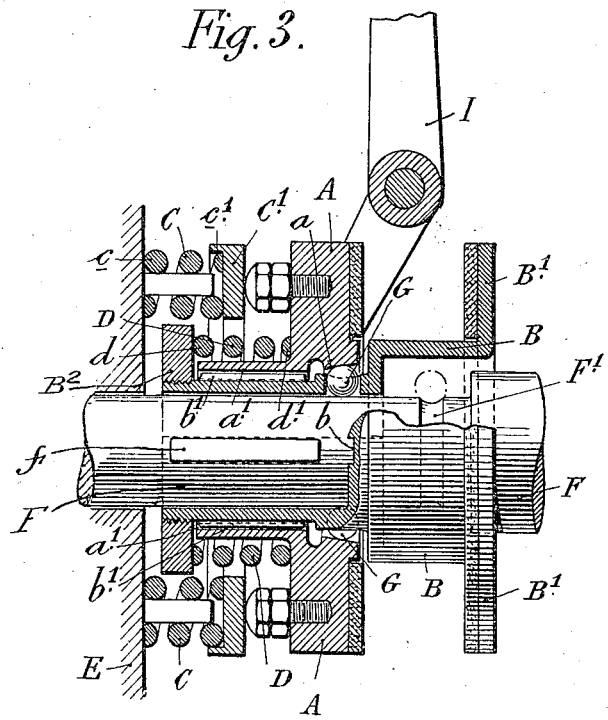

Patented Nov. 6, 1923.

1,472,855

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

AUTOMATIC TENSIONING APPARATUS FOR CLOSING THE PARTS OF A CLUTCH.

Original application filed October 29, 1920, Serial No. 420,525. Divided and this application filed January 5, 1922. Serial No. 527,274.

*To all whom it may concern:*

Be it known that I, EUGÈNE SCHNEIDER, a citizen of the Republic of France, and a resident of Paris, France, have invented new and useful Improvements in Automatic Tensioning Apparatus for Closing the Parts of a Clutch, which invention is fully set forth in the following specification.

This invention relates to improvements in automatic tensioning apparatus for clutches, of the type described and illustrated in French Patent No. 393,422 of August 14th, 1908, and in Patent Addition No. 13,598 of December 19th, 1910.

In devices of the type above referred to, considerable difficulty has been experienced in maintaining concentric relation between parts of the tensioning apparatus, due to unequal pressures exerted on the opposed frictional faces of the abutment members and scoring of the opposed friction surfaces by the separator members.

The primary object of this invention is to provide improved separator devices for overcoming the disadvantages above referred to.

A further object of this invention is to provide mechanism cooperating with moving parts of the tensioning apparatus so as to obtain an equal distribution of the force exerted thereon.

Other objects of this invention relate to an improved automatic tensioning apparatus for clutches which is simple in construction, efficient in operation and inexpensive to manufacture and install.

The invention may be embodied in a variety of mechanical expressions, one of which is shown in the accompanying drawings, but it is to be expressly understood that the drawings are for purposes of illustration only and are not to be taken as restrictive of the scope of the invention, reference being had to the appended claims for that purpose. In said drawings—

Fig. 3 is a sectional elevation of the apparatus shown in Fig. 1.

Figure 1:
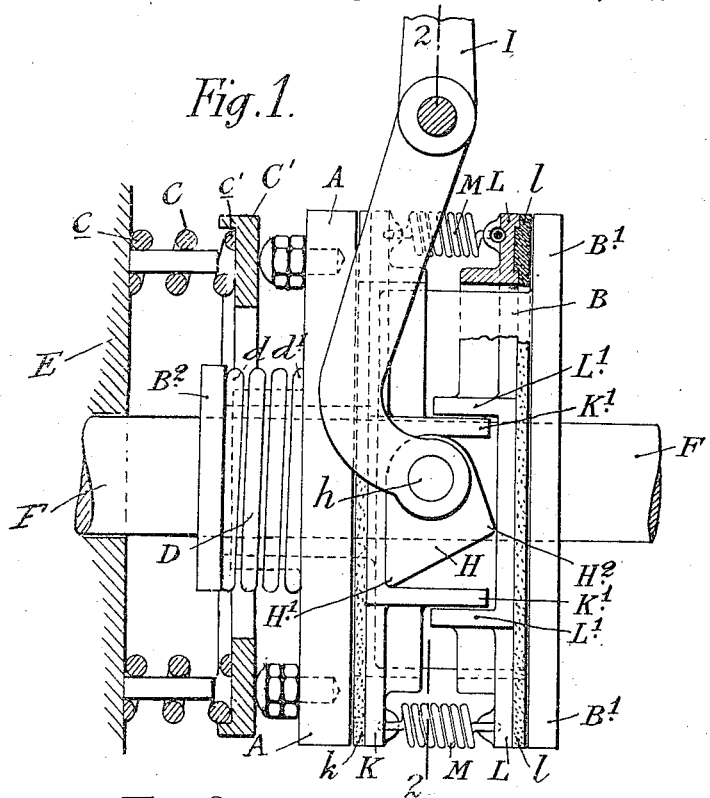
Fig. 1 is an elevation illustrating the invention applied to the closing spring of a clutch.
Figure 2:
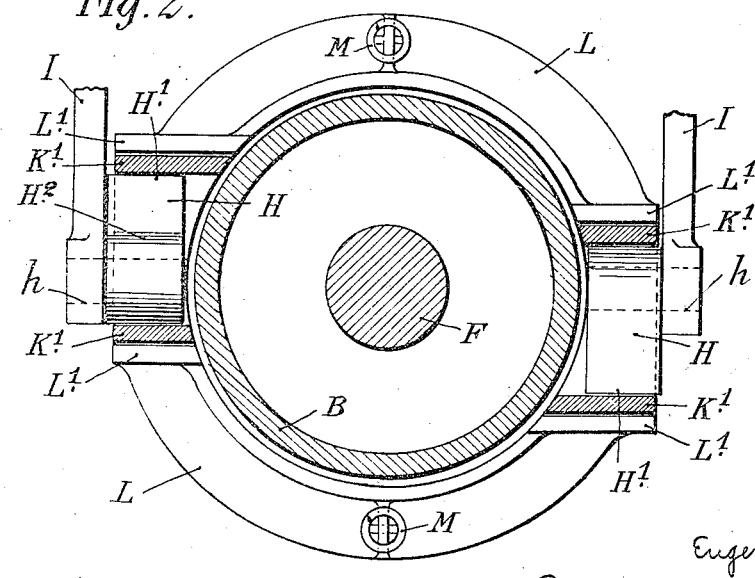
Fig. 2 is a section on the line 2—2 of Fig. 1.

Referring to the drawings, F is the driven shaft carrying a clutch part E (of which only a portion is shown diagrammatically) against which bears the ends $c$ of a plurality of springs C, the tension of which is to be regulated by means of the improved tensioning apparatus. The opposite ends $c^1$ of these springs bear against a movable abutment of the improved tensioning apparatus through the medium of an annular ring $C^1$. The movable abutment comprises a sleeve A having for a portion of its length a truncated conical inner surface $a$, and an annulus B carrying frictional members or balls G which bear against the surface $a$ and the shaft F for normally maintaining the parts locked together and in frictional engagement with the shaft F.

The ball annulus B and the sleeve A are moved relatively to each other in order to release the same from the shaft F, after which the sleeve A and annulus B may be moved longitudinally on the shaft to regulate the tension of spring C as desired. The annulus B engages by means of grooves $b$ upon ribs $f$ of the shaft F, and has external ribs $b^1$ by means of which it slides in corresponding grooves $a^1$ of the sleeve A. The annulus B is extended on both sides of the sleeve A; the abutment or flange $B^1$ for the separating members H being provided at one of the prolonged ends of the annulus, and the abutment for the spring D being provided by a washer $B^2$ having screw-threaded engagement on the opposite end of the annulus.

The separating members H are pivoted on axle pins $h$ carried by a forked lever or operating member I, and said separating members bear against spaced rings or washers K and L having spaced relation with and encircling sleeve portions of the movable abutment devices. The annular rings K and L are provided with suitable linings $k$, $l$ respectively, and concentric relation between the rings and relatively movable abutment devices is maintained by coacting slidable yokes $K^1$ and $L^1$ which extend from opposed faces of said rings and separators H housed within yokes $K^1$. The rings K and L are interconnected by springs M which normally tend to hold the rings away from the flanged ends of sleeve A and annulus B, respectively. $F^1$ designates an annular groove of shaft F in which the balls G engage at the end of the separating movement between the sleeve A and the ball pushing annulus B.

In operation, when it is desired to decrease the tension of springs C, the lower end of lever I is moved toward the right, thereby rotating the separators H about their pivots $h$ so as to cause the noses $H^1$ and $H^2$ of said separators to move the rings K, L apart against the tension of springs M. Said rings are thus engaged with the sleeve A and annulus B which are moved apart, whereby releasing action of balls G is effected. The abutment may then be moved to the right along shaft F until the desired tension of springs C is obtained. The rings K and L are always maintained in concentric relation with each other and the movable abutment devices by separators H and the co-acting slidable yokes $K^1$ and $L^1$, so that the pressure of friction surfaces $k, l$ is equally distributed to the flanged portions of sleeve A and annulus B. After the movable abutment has been properly positioned, the lower end of lever I is moved to the left a sufficient distance to cause separators H to assume the position shown in Fig. 1, whereupon the abutment devices will be locked to shaft F by the action of springs C, D. Springs M disengage rings K and L from the flanges of sleeve A and annulus B when the separators H assume their normal position. When it is desired to increase the tension of springs C, the lower end of lever I is moved to the left a sufficient distance to obtain the desired tension, ring K being thus engaged with sleeve A and these parts also moving to the left, thus releasing balls G. Movement of sleeve A, however, in turn compresses spring D which moves annulus B to the left thereby locking the abutment in the desired position.

It is obvious that various features of my invention may be used without employing other of the features illustrated and that changes may be made in the construction and arrangement of parts of the apparatus. Such changes and usage are therefore intended to be within the scope of the appended claims.

This application is a division of my pending application Serial No. 420,525, filed October 29, 1920.

What is claimed is:—

1. In an automatic tensioning apparatus for the spring closing means of a clutch, the combination with a shaft carrying the clutch part to be closed, of an abutment adjustable longitudinally of the shaft to increase or decrease the tension of said spring closing means, said abutment comprising a pair of flanged members normally having frictional engagement with said shaft, and mechanism for releasing and moving said members comprising a pair of rings encircling the same respectively, a forked lever, and spreaders carried by the ends of said lever and interposed between said rings whereby the latter are caused to engage the flanges of the abutment members respectively on movement of said lever.

2. In an automatic tensioning apparatus for the spring closing means of a clutch, in combination, a shaft carrying a clutch part forming an abutment for one end of the spring closing means, devices adjustable longitudinally on said shaft and providing an abutment for the other end of said spring closing means, and mechanism for moving said devices whereby the tension of said spring closing means may be regulated, said mechanism comprising rings equal in number to said devices and encircling the latter respectively, and a forked lever having terminals thereof interposed between said rings and causing the latter to frictionally engage the adjustable devices on movement of said lever.

3. In an automatic tensioning apparatus for the spring closing means of a clutch, in combination, a shaft carrying a clutch part providing an abutment for one end of the spring closing means, devices adjustable longitudinally on said shaft and providing an abutment for the other end of said spring closing means, and mechanism for moving said devices whereby the tension of said spring closing means may be regulated, said mechanism comprising rings equal in number to said adjustable devices and loosely encircling the same, a forked lever having terminals thereof interposed between said rings whereby the latter are caused to engage the adjustable devices on movement of said lever, and springs interconnecting said rings to normally maintain the same out of engagement with said devices.

4. In an automatic tensioning apparatus for the spring closing means of a clutch, in combination, a shaft carrying a clutch part providing an abutment for one end of the spring closing means, devices adjustable longitudinally on said shaft and providing an abutment for the other end of said spring closing means, and mechanism for moving said devices whereby the tension of said spring closing means may be regulated, said mechanism comprising rings equal in number to said devices and loosely encircling the same respectively, a pivoted lever, a member carried at one end of the lever and adapted on movement of the latter to bring said rings into engagement with said adjustable devices, and means maintaining concentric relation between said rings and said adjustable devices.

5. In an automatic tensioning apparatus for the spring closing means of a clutch, in combination, a shaft carrying a clutch part providing an abutment for one end of the spring closing means, devices adjustable longitudinally on said shaft and providing an abutment for the other end of said spring closing means, mechanism for moving said devices along said shaft to thereby regulate the tension of said spring closing means, said mechanism including rings equal in number to said devices and encircling the same in spaced relation therewith, coacting yokes extending from opposed faces of said rings, a forked lever, and members pivotally mounted at the forked ends of said lever and housed within said yokes for moving said rings into engagement with said adjustable devices on movement of said lever.

6. In an automatic tensioning apparatus for the spring closing means of a clutch including, in combination, a shaft carrying a clutch part providing an abutment for one end of said spring closing means, devices adjustable longitudinally on said shaft and providing an abutment for the other end of said spring closing means, and mechanism for moving said devices to thereby regulate the tension of said spring closing means, said mechanism comprising rings encircling said devices in spaced relation therewith and provided with coacting yokes, and a forked lever having members pivoted thereto and housed within said yokes, said members moving the rings into engagement with the adjustable devices on movement of said lever.

7. In an automatic tensioning apparatus for the spring closing means of a clutch including, in combination, a shaft carrying the clutch part to be closed, an abutment adjustable longitudinally on said shaft for regulating the tension of said spring closing means, mechanism for moving said abutment comprising rings encircling the abutment and having spaced relation therewith, and means for maintaining concentric relation between the abutment and said rings.

In testimony whereof I have signed this specification.

EUGÈNE SCHNEIDER.

Witnesses:
ANDRÉ MOSTICKER,
LOUIS GARDET.